United States Patent [19]
Plee et al.

[11] Patent Number: 5,503,007
[45] Date of Patent: Apr. 2, 1996

[54] MISFIRE DETECTION METHOD AND APPARATUS THEREFOR

[75] Inventors: Steven L. Plee, Brighton, Mich.; Donald J. Remboski, Jr., Northborough, Mass.; Marvin L. Lynch, Detroit, Mich.

[73] Assignee: Motorola, Inc., Schaumburg, Ill.

[21] Appl. No.: 955,780

[22] Filed: Oct. 5, 1992

[51] Int. Cl.$^6$ .................................................. G01M 15/00
[52] U.S. Cl. .......................................................... 73/117.3
[58] Field of Search ..................................... 73/116, 117.3, 73/35; 364/431.07, 431.08; 340/439; 123/419, 479, 436

[56] References Cited

U.S. PATENT DOCUMENTS

| | | |
|---|---|---|
| 4,083,234 | 4/1978 | Aono et al. . |
| 4,357,662 | 11/1982 | Schira et al. . |
| 4,372,269 | 2/1983 | Coles . |
| 4,380,800 | 4/1983 | Wilkinson . |
| 4,438,647 | 3/1984 | Ozaki et al. . |
| 4,697,561 | 10/1987 | Citron . |
| 4,766,863 | 8/1988 | Fujimori . |
| 4,932,379 | 6/1990 | Tang et al. . |
| 4,936,277 | 6/1990 | Deutsch et al. . |
| 5,044,194 | 9/1991 | James et al. . |
| 5,044,195 | 9/1991 | James et al. . |
| 5,056,360 | 10/1991 | Dosdall et al. ................ 73/116 |
| 5,076,098 | 12/1991 | Miwa . |
| 5,088,318 | 2/1992 | Osawa . |
| 5,095,742 | 3/1992 | James et al. . |
| 5,105,181 | 4/1992 | Ross . |
| 5,105,657 | 4/1992 | Nakaniwa ..................... 73/117.3 |
| 5,109,695 | 5/1992 | James et al. . |
| 5,331,848 | 7/1994 | Nakaniwa et al. ................ 73/116 |

FOREIGN PATENT DOCUMENTS

| | | |
|---|---|---|
| 4002208 | 8/1991 | Germany . |
| 4131383 | 3/1992 | Germany . |
| WO90/02871 | 3/1990 | WIPO . |
| WO91/11599 | 8/1991 | WIPO . |

OTHER PUBLICATIONS

Methods Of On-Board Misfire Detection, Gunther Plapp, Martin Klenk, and Winfried Moser, Robert Bosch GmbH 900232.

Diagnosis Of Individual Cylinder Misfires By Signature Analysis Of Crankshaft Speed Fluctuations, G. Rizzoni, University Of Michigan, Vehicular Electronics Lab, Copyright 1989 Society Of Automotive Engineers, Inc.

SAE Technical Paper Series, 860028, Computerized Knock Detection From Engine Pressure Records, M. D. Checke, & J. D. Dale, The University Of Alberta, International Congress And Exposition Feb. 24–28, 1986.

*Primary Examiner*—Robert Raevis
*Attorney, Agent, or Firm*—Nicholas C. Hopman

[57] ABSTRACT

A method for detecting a misfire condition by interpreting acceleration of an engine crankshaft (301) is described. The method teaches measurement of a first engine crankshaft acceleration, (405) proximate a first predetermined engine crankshaft angle, and provides a first reading (407) indicative of the first engine crankshaft acceleration, measurement of a second engine crankshaft acceleration, (417) proximate a second predetermined engine crankshaft angle, and provides a second reading (419) indicative of the second engine crankshaft acceleration, then combines (421) the first reading and the second reading and provides an acceleration coefficient (423) indicative of the combined readings. Then, a misfire is indicated (427) when the acceleration coefficient does not exceed a predetermined limit.

21 Claims, 3 Drawing Sheets

5,503,007

MISFIRE DETECTION METHOD AND APPARATUS THEREFOR

FIELD OF THE INVENTION

This invention is related to the field of misfire detection within an internal combustion engine, and more specifically to a method, and corresponding apparatus, for determining misfire during a combustion event in an engine by interpreting acceleration of the engine's crankshaft.

BACKGROUND OF THE INVENTION

Systems are employed in electronic engine controls for detecting a misfire of a combustion event. If a cylinder repeatedly misfires, fuel is typically shut off to that cylinder on the next engine cycle. This prevents the passage of a large amount of unburned fuel to an exhaust catalyst. This is done to prevent degradation of the catalyst's performance and useful life, and thereby minimize emissions.

Some misfire detection schemes use a rotational speed sensor mounted on an engine's crankshaft for converting engine rotation into an electrical signal. Some of these schemes monitor average angular velocity and attempt to predict misfiring based on signature analysis of this average engine crankshaft velocity. Other schemes rely on measuring average engine crankshaft acceleration. Both of these schemes suffer from inaccuracy because they rely on multi-combustion cycle averaging. This is problematic because these schemes are inaccurate and unreliable during transient operating conditions and other conditions related to combustion instability including engine crankshaft variability from cylinder to cylinder firings.

Additionally, the misfire component of the sensed signal varies considerably in magnitude and frequency over the full operating range of the engine. Since averaging schemes rely on predicting a change from a steady state condition they inherently loose accuracy under these transient operating conditions. Also, non-combustion related effects are substantial. These effects are typically attributable to variations in engine load torque, friction torque, and inertia torque.

Other schemes, embedded in ignition systems, can only detect ignition related misfiring conditions which are a subset of the possible misfiring conditions and therefore lack the full function necessary to accurately determine misfire.

What is needed is an improved system for detecting misfire in internal combustion engines that is more reliable, accurate, requires minimum calibration, and can be easily applied to different engine families.

SUMMARY OF THE INVENTION

A method, and corresponding apparatus, for detecting a misfire condition by interpreting acceleration of an engine crankshaft is described. The method teaches measurement of a first engine crankshaft acceleration, proximate a first predetermined engine crankshaft angle, and provides a first reading indicative of the first engine crankshaft acceleration, measurement of a second engine crankshaft acceleration, proximate a second predetermined engine crankshaft angle, and provides a second reading indicative of the second engine crankshaft acceleration, then combines the first reading and the second reading and provides an acceleration coefficient indicative of the combined readings. Then, a misfire is indicated when the acceleration coefficient does not exceed a predetermined limit.

DETAILED DESCRIPTION OF A PREFERRED EMBODIMENT

In a preferred embodiment, a method for detecting a misfire condition by interpreting acceleration of an engine crankshaft within a singular combustion cycle is described. The method teaches measurement of a first engine crankshaft acceleration, proximate a first predetermined engine crankshaft angle, and provides a first reading indicative of said first engine crankshaft acceleration, measurement of a second engine crankshaft acceleration, proximate a second predetermined engine crankshaft angle, and provides a second reading indicative of said second engine crankshaft acceleration, then combines the first reading and the second reading and provides an acceleration coefficient indicative of said combined readings. Then, a misfire indication is provided when the acceleration coefficient does not exceed a predetermined limit. Additionally, measurement of a third engine crankshaft acceleration, proximate cylinder TDC, provides a normalization coefficient which, when combined with the acceleration coefficient is used to substantially eliminate effects due to non-combustion related behavior of the engine crankshaft acceleration.

The improvements described in the preferred embodiment can be applied in any reciprocating class engine including for instance, a diesel engine, stratified charge engine, or a spark ignition engine. In the preferred embodiment the application to a spark ignition engine is detailed.

Figure 1:
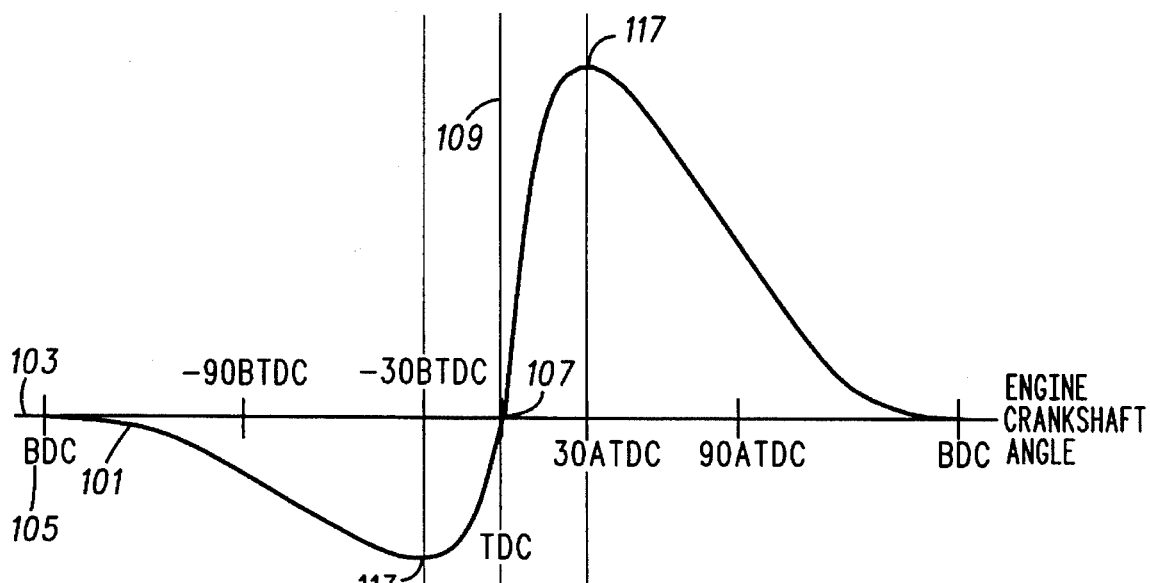
FIG. 1 is a chart of a signal derived from a sensor that is measuring the angular acceleration of an engine crankshaft and shows an acceleration profile of the engine crankshaft during a non-misfiring, or proper combustion cycle.

The chart in FIG. 1 shows a signal 101 derived from a sensor that is measuring the angular acceleration of an engine crankshaft during a singular combustion cycle. In this case, the acceleration signal 101 shown is one resulting from a non-misfiring, or proper combustion cycle.

The horizontal axis 103 is shown in terms of degrees of engine crankshaft angular rotation, relative to cylinder BDC compression 105, or bottom dead center, and cylinder TDC 107, or top dead center. The vertical axis 109 is expressed in terms of engine crankshaft acceleration. Notice that starting at cylinder BDC 105 the acceleration signal is substantially equal to zero. At this engine angular position a piston is in a compression portion of the cycle. As the engine crankshaft turns the engine crankshaft, thus the acceleration signal 101, decels, or has a negative acceleration. At 30° BTDC 113, or before top dead center, this negative acceleration trend reverses to a positive trend. This positive acceleration trend continues past cylinder TDC 107, where it is substantially zero, to a following angular position 30° ATDC 117 where the acceleration trend reverses. Typically, individual cylinder combustion occurs somewhere between 20° before cylinder TDC and 40° after cylinder TDC, depending on operating conditions. Note that at 30° ATDC 117, or after top dead center, the absolute value of engine crankshaft acceleration is higher than it was at 30° BTDC. This is because proper combustion occurred which resulted in this difference. It is this difference in engine crankshaft acceleration that is used to detect the difference between a proper firing and a misfiring condition.

Figure 2:
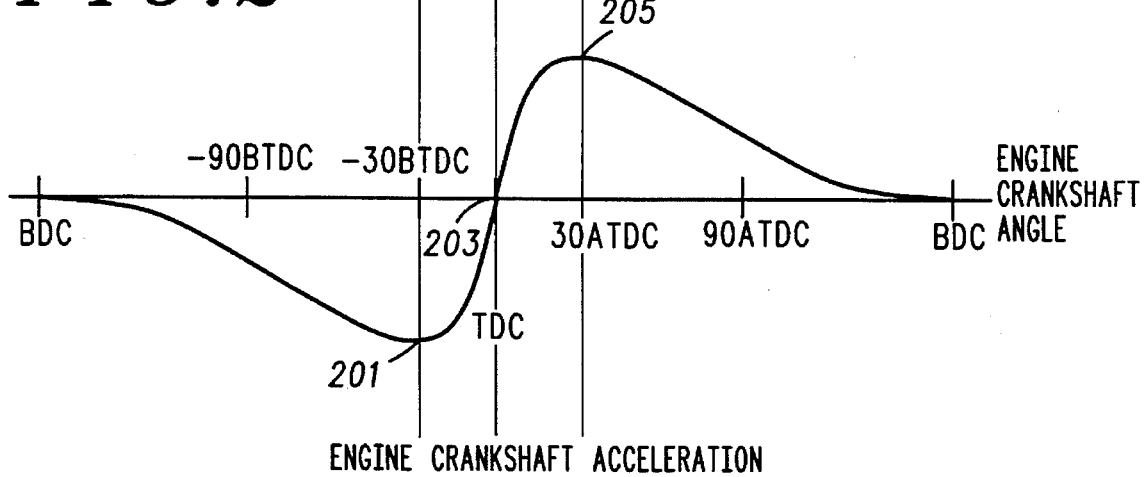
FIG. 2 is a chart of a signal derived from a sensor that is measuring the angular acceleration of an engine crankshaft and shows an acceleration profile of the engine crankshaft during a misfiring, or improper combustion cycle.

The chart in FIG. 2 shows a signal indicative of a misfiring, or improper combustion cycle, and uses the same horizontal and vertical axes as FIG. 1. When comparing this signal to that of FIG. 1 it can be seen that the engine crankshaft acceleration is substantially the same at 30° BTDC 201 and at cylinder TDC 203. However, at 30° ATDC 205 the absolute value of engine crankshaft acceleration is significantly lower than it was in FIG. 1 at 30° ATDC. It is this relationship, between engine crankshaft acceleration at 30° BTDC and 30° ATDC that is important to determining a misfire condition.

Figure 3:
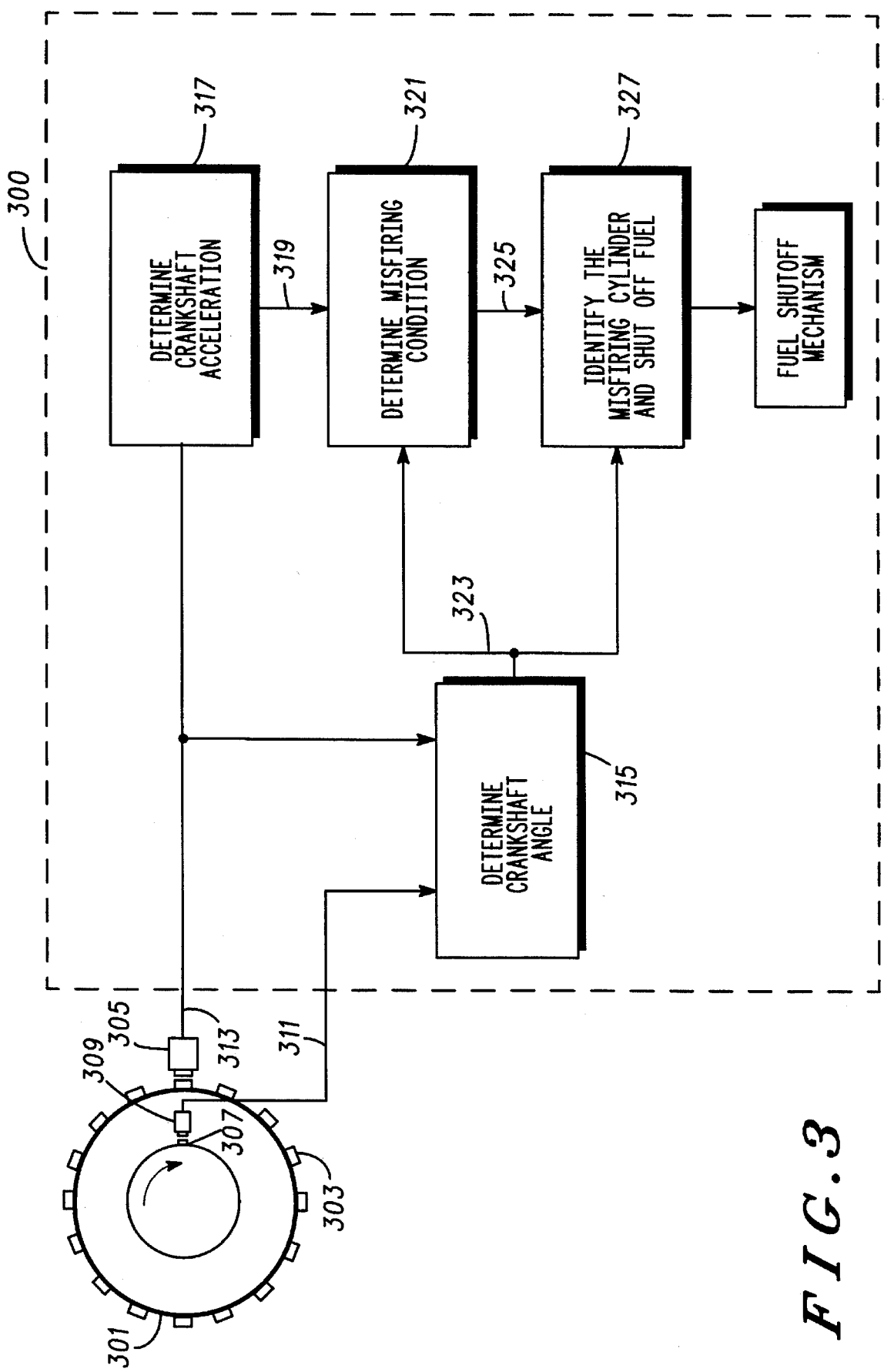
FIG. 3 is a system block diagram of a misfire detection system, in accordance with the invention.

FIG. 3 is a system block diagram of a misfire detection system that overcomes the disadvantages of the prior art. In the preferred embodiment a method is described for implementing this system. Of course, those skilled in the art will recognize that a corresponding apparatus may be constructed to achieve the same advantages.

In the preferred embodiment a Motorola MC68HC11E9 microcontroller 300 executes the method embedded in firmware form. The firmware is represented later in flow chart form in FIG. 4. The use of the MC68HC11E9 microcontroller 300 is advantageous because it has integral counters that are useful in processing an acceleration signal described below. Those skilled in the art will recognize many other substantially equivalent hardware platforms for executing the method.

A flywheel 301, is connected to an engine crankshaft and has lobes, or teeth 303 disposed on the exterior edge. In the preferred embodiment these are spaced at 10° intervals for the convenience of the method that is described. Of course, those skilled in the art will acknowledge that other tooth spacing will yield the same beneficial results. These teeth, 303 are sensed by an inductive transducer 305 as the flywheel 301 is driven by the engine crankshaft. The inductive transducer 305 provides a signal 313 indicative of the angular position, or velocity, of the flywheel 301.

A separate singular tooth 307 is located at engine TDC and is sensed by another inductive transducer 309. The inductive transducer 309 provides a signal 311 indicative of TDC of the flywheel 301. Both of these signals 311 and 313 are provided to counter inputs of the MC68HC11E9 microcontroller 300 for further processing and are used to determine the individual cylinder TDC's necessary to execute the misfire detection method.

Of course, other sensing technologies such as Hall-Effect, optical and RF may be used in place of the flywheel teeth 303, 307 and the corresponding sensors 305 and 309. Also, those skilled in the art may contemplate other methods of measuring the acceleration, thus the torque output, from the combustion process that will also benefit from this method. This may include, for instance, an in-line torque sensor. The method described herein only relies on the torque output of the engine measured as engine crankshaft acceleration information, and the corresponding absolute position information, or engine TDC information no matter how it is sensed.

Element 315 represents a firmware routine that determines, given the signal 313, and the signal 311, the absolute engine crankshaft position in terms of angular displacement. As mentioned earlier the flywheel teeth 303 are spaced at 10° intervals. This routine, synchronized by the singular tooth 307 is located at flywheel TDC, simply counts teeth to determine the absolute engine crankshaft position in terms of angular displacement. In the preferred embodiment a four stroke six cylinder engine is used. The firing order is 1, 4, 2, 5, 3, 6. Cylinder TDC is then 720°/6 or expected every 120°. Therefore, cylinder 1 TDC is located at 0° flywheel position, cylinder 4 TDC is located at 120° flywheel position, cylinder 2 TDC is located at 240° flywheel position, cylinder 5 TDC is located at 360° flywheel position, cylinder 3 TDC is located at 480° flywheel position, and cylinder 6 TDC is located at 600° flywheel position. Of course, other engines with different firing orders and cylinder TDC's can be easily measured with other flywheel teeth arrangements and slight modifications to the routine 315. Those skilled in the art will recognize many other, equivalent means and methods to determine absolute engine crankshaft position.

The angular position, or velocity, signal 313 is also provided to element 317 which determines the engine crankshaft acceleration. Those skilled in the art will also recognize many techniques of extracting this information from the velocity signal 313. In the preferred embodiment a counter, embedded in the MC68HC11E9 microcontroller 300, counts the time between the flywheel teeth 303. The result is used to calculate the engine crankshaft acceleration by comparing successive values of measured times. Preferably, a filter is then applied to remove a portion of the non-combustion torque related information. This may take the form of torsional vibrations, or very low frequency acceleration effects. After processing by element 317 the engine crankshaft acceleration 319 is provided to an element 321, along with a determined crankshaft angle 323 provided by element 315 as detailed earlier.

Element 321 is the core of the method and is detailed in flow chart form in FIG. 4 later. At an output 325 of element 321 a misfire indication is provided when a misfiring condition is detected. This misfire indication 325 is provided to an element 327 that, along with a determined crankshaft angle 323 provided by element 315, identifies the misfiring cylinder and shuts off the fuel to that particular cylinder at its next fueling cycle. This assumes that the MC68HC11E9 microcontroller 300 has broader function as an engine controller with facilities to control fueling. These details are not provided because those skilled in the art are very familiar with numerous apparatus and methods for providing this function. Note that the method, and corresponding apparatus described herein may either conveniently be embedded into a larger system or used as a stand alone function.

Figure 4:
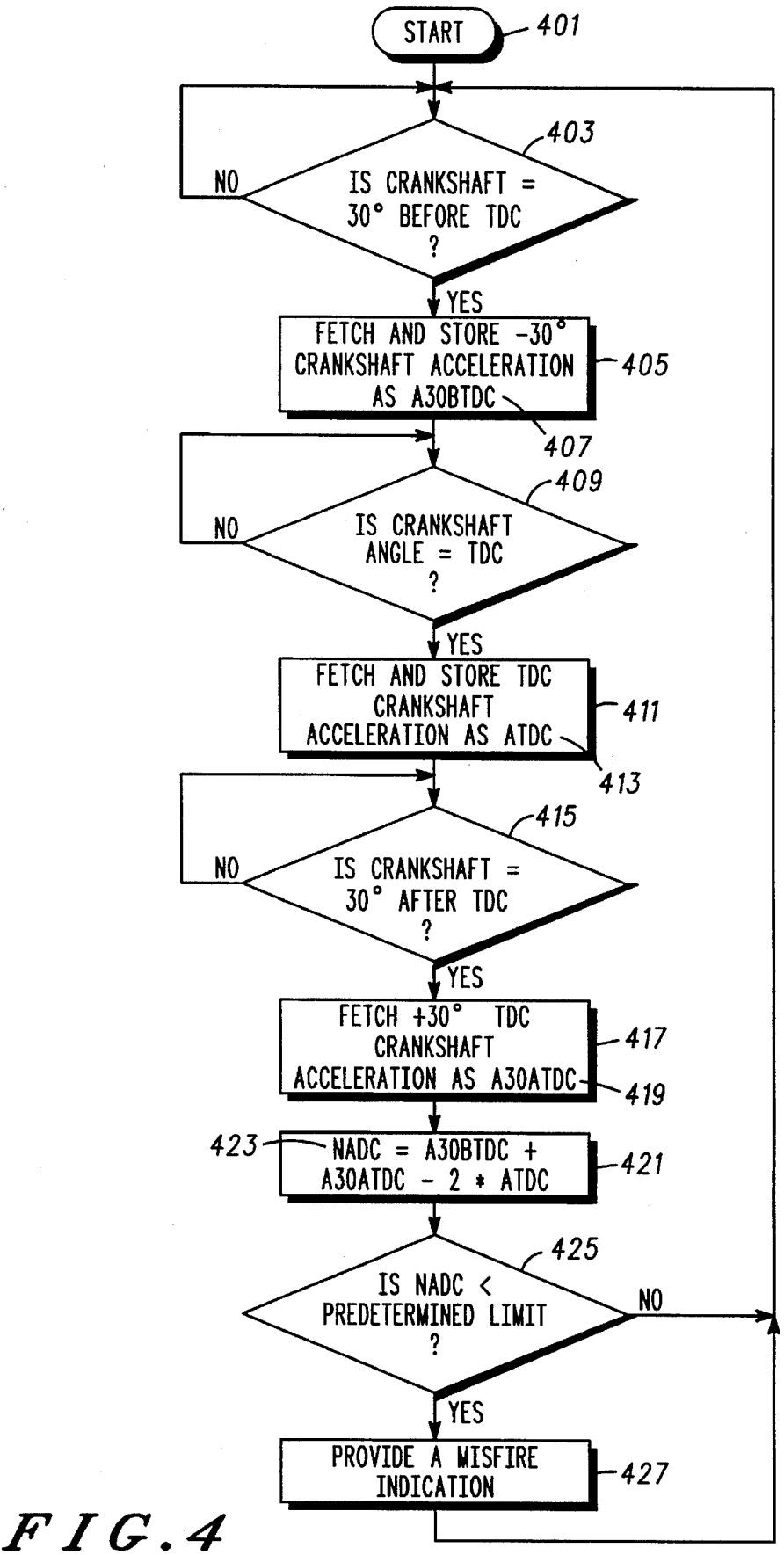
FIG. 4 is a method flow chart describing the operation of the misfire method.

FIG. 4 is a method flow chart describing the operation of the misfire detection method. As mentioned above, this is representative of the firmware programmed into the MC68HC11E9 microcontroller 300. This firmware essentially recognizes the difference in behavior between the engine crankshaft acceleration signals shown in FIG. 1 and FIG. 2. Also, the routine also describes additional steps to eliminate any unfiltered non-combustion related engine crankshaft acceleration effects. This makes this method a very attractive alternative to prior art misfire detection systems because of the improved accuracy and reliability of misfire detection provided. This improved accuracy and reliability is partially due to the inherent, non-averaged nature of this approach and also to the unique, powerful concept of normalization of the measurement at cylinder TDC when no combustion related torque is possible.

The engine crankshaft acceleration signal comprises torque related and non-combustion related information. In order to eliminate the torque related information it must be subtracted from both of the torque related measurements. This will be detailed below.

In step 401 the routine is entered every time a cylinder combustion cycle commences. Note that this routine shows that the method directly measures acceleration at a crankshaft angle of interest by waiting until it senses that angle. This is only one of the many ways to do this. Of course, those skilled in the art will recognize other, equivalent techniques such as capturing engine crankshaft acceleration's in separate routines and recalling and processing it here.

In the next step 403 the routine waits until the measured engine crankshaft angle is proximate a first predetermined engine crankshaft angle, in this case 30° before cylinder TDC. As noted earlier 30° before cylinder TDC is located within a compression stroke. When it is equal to 30° before cylinder TDC, in step 405, the routine fetches and stores the engine crankshaft acceleration reading as a variable named A30BTDC 407, which is indicative of the engine crankshaft acceleration at 30° before cylinder TDC.

This same capturing process occurs again in steps 409 and 411 for another predetermined engine crankshaft angle. In step 409 the routine waits until the measured engine crankshaft angle is proximate another predetermined engine crankshaft angle, in this case cylinder TDC, also referred to as a third predetermined engine crankshaft angle. When it is proximate, in step 411, the routine fetches and stores the engine crankshaft acceleration reading as a variable named ATDC 413, which is indicative of the engine crankshaft acceleration at cylinder TDC. This variable ATDC 413 is also known as the normalization coefficient. It is used to substantially eliminate effects due to non-combustion related behavior of the engine crankshaft acceleration 319.

In the next step 415 the routine waits until the measured engine crankshaft angle is proximate a second predetermined engine crankshaft angle, in this case 30° after cylinder TDC. As noted earlier 30° after cylinder TDC is located within an expansion stroke. When it is equal to 30° after cylinder TDC, in step 417, the routine fetches and stores the engine crankshaft acceleration as a variable named A30ATDC 419, which is indicative of the engine crankshaft acceleration at 30° after cylinder TDC.

Next, in step 421 the three stored readings, or variables are recalled and combined, preferably by adding the A30BTDC 407 reading to the A30ATDC 419 reading and subtracting twice the ATDC 413 reading. This provides a NADC 423, or normalized acceleration coefficient. Preferably twice the variable ATDC 413 is subtracted because, as mentioned above, the non-combustion related acceleration must be subtracted from both the compression cycle reading and the expansion cycle reading. This same combustion cycle normalization, or elimination of non-combustion related effect, offers a substantial accuracy advantage over the prior art. This is because accurate torque related acceleration is available for detecting a misfire condition, without pretending that historical, or averaged, non-combustion related effect can be subtracted from a real time reading, yielding a reliable result, as prior art systems did.

What is claimed is:

1. A method for detecting a misfire condition by interpreting acceleration of an engine crankshaft comprising the steps of:

measuring a first engine crankshaft acceleration, proximate a first predetermined engine crankshaft angle located within a compression stroke, and providing a first reading indicative of said first engine crankshaft acceleration;

measuring a second engine crankshaft acceleration, proximate a second predetermined engine crankshaft angle located within an expansion stroke adjoining said compression stroke, and providing a second reading indicative of said second engine crankshaft acceleration;

combining the first reading and the second reading and providing an acceleration coefficient indicative of said combined readings; and providing a misfire indication when the acceleration coefficient does not exceed a predetermined limit.

2. A method in accordance with claim 1 wherein said step of measuring a first engine crankshaft acceleration, proximate a first predetermined engine crankshaft angle, comprises measuring a first engine crankshaft acceleration proximate 30° BTDC of a cylinder.

3. A method in accordance with claim 2 wherein said step of measuring a second engine crankshaft acceleration, proximate a second predetermined engine crankshaft angle, comprises measuring a second engine crankshaft acceleration proximate 30° ATDC of the cylinder.

4. A method in accordance with claim 1 wherein said step of measuring a first engine crankshaft acceleration, proximate a first predetermined engine crankshaft angle, comprises measuring a first engine crankshaft acceleration within a range of +−10° located around 30° BTDC of a cylinder, and said step of measuring a second engine crankshaft acceleration, proximate a second predetermined engine crankshaft angle, comprises measuring a second engine crankshaft acceleration within a range of +−10° located around 30° ATDC.

5. A method in accordance with claim 1 wherein the step of combining comprises adding the first reading to the second reading.

6. A method in accordance with claim 1 further comprising the steps of:

measuring a third engine crankshaft acceleration proximate cylinder TDC and providing a normalization coefficient;

combining the normalization coefficient with the acceleration coefficient and providing a normalized acceleration coefficient; and wherein said step of providing a misfire indication provides a misfire indication when the normalized acceleration coefficient does not exceed a predetermined limit.

7. A method in accordance with claim 6 wherein said step of combining comprises subtracting the normalization coefficient from the acceleration coefficient.

8. A method in accordance with claim 6 wherein said step of combining comprises subtracting twice the normalization coefficient from the acceleration coefficient.

9. An apparatus for detecting a misfire condition by interpreting acceleration of an engine crankshaft comprising:

means for measuring a first engine crankshaft acceleration, proximate a first predetermined engine crankshaft angle located within a compression stroke, and providing a first reading indicative of said first engine crankshaft acceleration;

means for measuring a second engine crankshaft acceleration, proximate a second predetermined engine crankshaft angle located within an expansion stroke adjoining said compression stroke, and providing a second reading indicative of said second engine crankshaft acceleration;

means for combining the first reading and the second reading and providing an acceleration coefficient; and means for providing a misfire indication when the acceleration coefficient does not exceed a predetermined limit.

10. An apparatus in accordance with claim 9 wherein said means for measuring a first engine crankshaft acceleration, proximate a first predetermined engine crankshaft angle, comprises means for measuring a first engine crankshaft acceleration proximate 30° BTDC of a cylinder.

11. An apparatus in accordance with claim 10 wherein said means for measuring a second engine crankshaft acceleration, proximate a second predetermined engine crankshaft angle, comprises means for measuring a second engine crankshaft acceleration proximate 30° ATDC of the cylinder.

12. An apparatus in accordance with claim 9 wherein said means for measuring a first engine crankshaft acceleration, proximate a first predetermined engine crankshaft angle, comprises means for measuring a first engine crankshaft acceleration within a range of +−10° located around 30° BTDC of a cylinder, and said means for measuring a second engine crankshaft acceleration, proximate a second predetermined engine crankshaft angle, comprises means for measuring a second engine crankshaft acceleration within a range of +−10° located around 30° ATDC.

13. An apparatus in accordance with claim 11 further comprising:
means for measuring a third engine crankshaft acceleration, proximate cylinder TDC, and providing a normalization coefficient;
means for combining the normalization coefficient with the acceleration coefficient and providing a normalized acceleration coefficient, and wherein said means for providing a misfire indication provides a misfire indication when the normalized acceleration coefficient does not exceed a predetermined limit.

14. An apparatus in accordance with claim 13 wherein said means for combining comprises means for subtracting the normalization coefficient from the acceleration coefficient.

15. An apparatus in accordance with claim 13 wherein said means for combining comprises means for subtracting twice the normalization coefficient from the acceleration coefficient.

16. An apparatus for detecting a misfire condition by interpreting acceleration of an engine crankshaft within a singular combustion cycle comprising:
means for measuring a first engine crankshaft acceleration proximate 30° before cylinder TDC and providing a first reading indicative of said first engine crankshaft acceleration;
means for measuring a second engine crankshaft acceleration proximate 30° after cylinder TDC and providing a second reading indicative of said second engine crankshaft acceleration;
means for measuring engine crankshaft acceleration proximate cylinder TDC and for providing a third reading; and
means for adding the first reading to the second reading, subtracting twice the third reading, and for providing a misfire indication if the summation does not exceed a predetermined limit.

17. A system for detecting a misfire condition by interpreting acceleration of an engine crankshaft comprising:
angle measurement means for providing an indication of an instantaneous position of said engine's engine crankshaft;
cylinder TDC measurement means for providing an indication of a top dead center position on said engine's engine crankshaft;
means for measuring a first engine crankshaft acceleration proximate 30° before cylinder TDC, responsive to said angle measurement means and said cylinder TDC measurement means, and providing a first reading indicative of said first engine crankshaft acceleration;
means for measuring a second engine crankshaft acceleration proximate 30° after cylinder TDC, responsive to said angle measurement means and said cylinder TDC measurement means, and providing a second reading indicative of said second engine crankshaft acceleration;
means for combining the first reading with the second reading and providing an acceleration coefficient; and
means for providing a misfire indication when the acceleration coefficient does not exceed a predetermined limit.

18. A system in accordance with claim 17 further comprising:
means for measuring a third engine crankshaft acceleration proximate cylinder TDC and providing a normalization coefficient dependent thereon; and
means for combining the normalization coefficient with the acceleration coefficient and providing a normalized acceleration coefficient.

19. A system in accordance with claim 18 wherein the means for combining comprises means for subtracting the normalization coefficient from the acceleration coefficient.

20. A system in accordance with claim 14 wherein the means for combining comprises means for subtracting the normalization coefficient from the acceleration coefficient.

21. A system in accordance with claim 18 further comprising:
means for providing a misfire indication when the normalized acceleration coefficient does not exceed a predetermined limit; and
means for shutting off fuel, responsive to said misfire indication.

* * * * *